United States Patent
Küllmer et al.

(10) Patent No.: US 12,296,782 B2
(45) Date of Patent: May 13, 2025

(54) DRIVE DEVICE FOR A VEHICLE FLAP

(71) Applicant: Edscha Engineering GmbH, Remscheid (DE)

(72) Inventors: Fabian Küllmer, Remscheid (DE); Sergej Steigerwald, Remscheid (DE)

(73) Assignee: Edscha Engineering GmbH, Remscheid (DE)

( * ) Notice: Subject to any disclaimer, the term of this patent is extended or adjusted under 35 U.S.C. 154(b) by 0 days.

(21) Appl. No.: 18/373,619

(22) Filed: Sep. 27, 2023

(65) Prior Publication Data

US 2024/0101062 A1    Mar. 28, 2024

(30) Foreign Application Priority Data

Sep. 28, 2022  (DE) .................... 10 2022 124 965.4

(51) Int. Cl.
  *B60R 21/38*  (2011.01)
  *B60R 21/34*  (2011.01)
  (Continued)

(52) U.S. Cl.
  CPC .............. *B60R 21/34* (2013.01); *B60R 21/38* (2013.01); *E05D 3/06* (2013.01); *E05D 3/145* (2013.01);
  (Continued)

(58) Field of Classification Search
  CPC ... B60R 21/38; B60R 21/34; B60R 2021/343; E05D 3/06; E05D 3/145; E05D 3/14;
  (Continued)

(56) References Cited

U.S. PATENT DOCUMENTS 5,531,122 A  *  7/1996  Chatham .................. G07C 3/00
                                                                  73/806

FOREIGN PATENT DOCUMENTS

CN       112610101 A  *  4/2021  ............. B60R 21/38
DE       19712961 A1      10/1998
(Continued)

*Primary Examiner* — Keith J Frisby
(74) *Attorney, Agent, or Firm* — Davidson Kappel LLC

(57) ABSTRACT

The present disclosure relates to a drive device for a movable vehicle flap, including a flap part associated with the vehicle flap, a body part associated with a vehicle body, a first joint arrangement being arranged between the flap part and the body part, including a first knee lever and a second knee lever. The first knee lever and the second knee lever each have at least a first control arm and a second control arm. The drive device further includes a second joint arrangement for opening and closing the vehicle flap in a normal operation and at least a first actuator for raising the vehicle flap to a pedestrian protection position. The first actuator has a first connection element and a second connection element. The first connection element of the first actuator is hingedly coupled to the first knee lever of the first joint arrangement. The second connection element of the first actuator is hingedly coupled to the second knee lever of the first joint arrangement. A drive device for a vehicle flap, which is reliable and compact, is provided according to the present disclosure by the first connection element of the first actuator being hingedly coupled to the second control arm of the first knee lever and by the second connection element of the first actuator being hingedly coupled to the first control arm of the second knee lever.

15 Claims, 6 Drawing Sheets

(51) Int. Cl.
*E05D 3/06* (2006.01)
*E05D 3/14* (2006.01)
*E05D 7/00* (2006.01)
*E05F 15/72* (2015.01)

(52) U.S. Cl.
CPC ............... *E05D 7/00* (2013.01); *E05F 15/72* (2015.01); *E05Y 2900/536* (2013.01)

(58) Field of Classification Search
CPC ...... E05D 7/00; E05F 15/72; E05Y 2900/536; E05Y 2900/546; E05Y 2201/232; E05Y 2201/252; E05Y 2201/67; E05Y 2600/11; E05Y 2800/407
USPC ........ 180/274, 271, 69.2, 69.21; 296/193.11, 296/187.04
See application file for complete search history.

(56) References Cited

FOREIGN PATENT DOCUMENTS

| | | | | |
|---|---|---|---|---|
| DE | 19922454 | A1 | 11/2000 | |
| DE | 10144811 | A1 | 3/2003 | |
| DE | 10253441 | B3 * | 4/2004 | ............. B60R 21/38 |
| DE | 102004002213 | A1 | 8/2004 | |
| DE | 10314180 | A1 | 9/2004 | |
| DE | 10314968 | A1 | 10/2004 | |
| DE | 10350677 | A1 | 6/2005 | |
| DE | 102006010801 | A1 * | 9/2007 | ............. B60R 21/38 |
| DE | 102006031617 | A1 | 1/2008 | |
| DE | 102010023283 | A1 | 12/2011 | |
| EP | 0161750 | A1 * | 11/1985 | |
| GB | 2403190 | A | 12/2004 | |

* cited by examiner

DRIVE DEVICE FOR A VEHICLE FLAP

The present disclosure relates to a drive device for a vehicle flap comprising a flap portion associated with the vehicle flap, a body portion associated with a vehicle body, a first joint arrangement disposed between the flap portion and the body portion and comprising a first toggle lever and a second toggle lever wherein the first knee lever and the second knee lever each comprise a first control arm and a second control arm, wherein the first control arm of the first knee lever and the second control arm of the first knee lever are hingedly coupled to one another, and the first control arm of the second knee lever and the second control arm of the second knee lever are hingedly coupled to one another.

BACKGROUND

Drive devices for flaps of vehicles are known from practice, wherein the drive devices are provided to immediately displace a front flap into a raised pedestrian protection position in the event of a collision with a pedestrian, in order to provide a deformation space in an area of the front of the vehicle, thereby reducing a risk of injury to the pedestrian.

DE 101 44 811 A1 discloses a drive device for a vehicle flap that can be opened, comprising a first joint arrangement arranged between the vehicle flap and a body and having a first knee lever and a second knee lever, wherein the first knee lever and the second knee lever comprise a first control arm and a second control arm, respectively. The first control arm of the first knee lever and the second control arm of the first knee lever or the first control arm of the second knee lever and the second control arm of the second knee lever are hingedly coupled to one another. Further, the drive device comprises a first actuator for raising the vehicle flap to a pedestrian protection position, wherein the first actuator has a first connection element, wherein the first connection element of the first actuator is pivotally coupled to the first knee lever of the first joint arrangement. The drive device takes up a relatively large amount of space, which is a disadvantage.

DE 103 14 180 A1 shows an actuator for a vehicle flap that can be opened, comprising a flap part associated with the vehicle flap, a body part associated with a vehicle body, and a first joint arrangement arranged between the flap part and the body part. The first joint arrangement comprises a first knee lever and a second knee lever, wherein the first knee lever and the second knee lever each comprise a first control arm and a second control arm, wherein the first control arm of the first knee lever and the second control arm of the first knee lever, and the first control arm of the second knee lever and the second control arm of the second knee lever, respectively, are pivotally coupled to one another. Further, the actuator comprises a spring device having a first coil spring and having a second coil spring for raising the vehicle flap to a pedestrian protection position, wherein the first coil spring is associated with the first knee lever and the second coil spring is associated with the second knee lever.

SUMMARY

It is an object of the present disclosure to provide a drive device for a vehicle flap which is reliable and compact.

In accordance with the present disclosure, a drive device for a deployable vehicle flap is provided comprising a flap portion associated with the vehicle flap, a body portion associated with a vehicle body, a first joint arrangement disposed between the flap portion and the body portion and comprising a first toggle lever and a second toggle lever wherein the first knee lever and the second knee lever each comprise a first control arm and a second control arm, wherein the first control arm of the first knee lever and the second control arm of the first knee lever are hingedly coupled to one another, and the first control arm of the second knee lever and the second control arm of the second knee lever are hingedly coupled to one another. Further the drive device comprises a second joint arrangement, which is used for opening and closing of the flap in a normal mode. The drive device further comprises a first actuator for raising the vehicle flap to a pedestrian protection position, wherein the first actuator has a first connection element and a second connection element, wherein the first connection element of the first actuator is hingedly coupled to the first knee lever of the first joint arrangement, wherein the second connection element of the first actuator is hingedly coupled to the second knee lever of the first joint arrangement. The drive device is characterized in that the first connection element of the first actuator is hingedly coupled to the second control arm of the first knee lever and in that the second connection element of the first actuator is hingedly coupled to the first control arm of the second knee lever.

Advantageously, in the event of a collision, an opening force can be reliably and quickly applied directly to the first knee lever via the first actuator, so that the vehicle flap is immediately moved into the pedestrian protection position.

Further advantageously, a connection of the second connection element of the first actuator to the first control arm of the second knee lever serves as a kind of abutment with respect to the first actuator, so that the set-up force required for displacing the vehicle flap into the pedestrian protection position is directly and effectively introduced into the first joint arrangement. Advantageously, both the first knee lever and the second knee lever are moved to the pedestrian protection position at the same time.

Advantageously, a compact and reliable drive device is provided which, in a folded state, occupies a small installation space in normal operation of a vehicle and, in the event of a vehicle collision, lifts the vehicle flap particularly quickly and effectively to move it into the pedestrian protection position. The compactness results from the fact that the first actuator is arranged between the two toggle levers and thus does not require any additional installation space. Further advantageously, the vehicle flap is displaced quickly, i.e. over a relatively large distance relative to the stroke of the first actuator, both in a vertical direction and in a horizontal direction even at a small stroke of the first actuator. This is achieved by simultaneously driving the first knee lever and the second knee lever to the pedestrian protection position for a given stroke of the first actuator. This creates a sufficient distance between, for example, an engine block and the vehicle flap so that sufficient deformation space is provided in the event of a collision.

It is expedient that, for opening and closing the vehicle flap in normal operation, the body part and the flap part are hingedly coupled to one another via a second joint arrangement. Since the first joint arrangement is only used in the event of a collision, the vehicle flap can always be reliably opened and closed via the second joint arrangement. Further, the drive device is operable independently of a second actuator that can be coupled to the second joint arrangement and can be provided for opening and closing the vehicle flap in the normal mode. Alternatively, the vehicle flap can be opened and closed manually.

Preferably, the first joint arrangement and the second joint arrangement are coupled to each other via an intermediate lever. The intermediate lever is advantageously designed as a connection piece between the first joint arrangement and the second joint arrangement. The first joint arrangement and the second joint arrangement are, on the one hand, connected to the intermediate lever, and, on the other hand, the first joint arrangement has a first adjustment kinematics and the second joint arrangement has a second adjustment kinematics, wherein the first adjustment kinematics and the second adjustment kinematics are independent of each other due to the intermediate lever.

Conveniently, the first control arm of the first knee lever and the first control arm of the second knee lever are hinged to the intermediate lever. Advantageously, the first knee lever and the second knee lever can be pivoted independently of the second joint arrangement via the respective first control arms to ensure the defined first adjustment kinematics of the drive device.

Preferably, the second control arm of the first knee lever and the second control arm of the second knee lever are hingedly coupled to the flap part. Advantageously, the first knee lever and the second knee lever connect the flap part to the intermediate lever via the respective second control arms in order to reliably shift the flap part into the pedestrian protection position relative to the intermediate lever or the body part.

In accordance with a preferred embodiment, in the normal operation of the vehicle flap, the first control arm and the second control arm of the first knee lever include a first acute angle. Advantageously, the non-activated drive device has a compact design in that the first knee lever assumes a folded state in the normal operation, which corresponds approximately to an almost closed pair of scissors. When shifting to the pedestrian protection position, the angle enclosed between the first and second handlebars is increased accordingly. Advantageously, a relatively large stroke in the vertical direction is achieved when the first knee lever is driven into the erected position by the first actuator.

In accordance with a preferred embodiment, in the normal operation of the vehicle flap, the first control arm and the second control arm of the second knee lever include a second acute angle. Advantageously, the non-activated drive device has a compact design in that the second toggle lever assumes a folded state in the normal operation, which corresponds approximately to an almost closed pair of scissors. When shifting to the pedestrian protection position, the angle enclosed between the first and second handlebars is increased accordingly. Advantageously, a relatively large stroke in the vertical direction is achieved when the second knee lever is driven into the erected position by the first actuator.

In an advantageous embodiment, it is provided that the first control arm of the second knee lever has a first end stop, and that a first counter stop is associated with the first end stop. Advantageously, further pivoting movement of the first control arm of the second knee lever relative to the second control arm is prevented by contacting the first end stop with the first counter stop, so that a defined adjustment kinematics of the first joint arrangement is ensured.

In accordance with one embodiment, the first counter stop is designed as a protruding pivot, and the first end stop is designed as a nose protruding from the first control arm of the second knee lever. Advantageously, a reliable end stop is ensured via the pivot and the nose, so that a defined adjustment kinematics of the first joint arrangement is always guaranteed.

Conveniently, the intermediate lever remains motionless when the vehicle flap is moved to the pedestrian protection position. Advantageously, the vehicle flap can thus be moved to the pedestrian protection position free of unnecessary weight. As a result, rapid and reliable movement of the vehicle flap into the pedestrian protection position is always ensured via the drive device.

In a preferred embodiment, the first connection element and the second connection element of the first actuator are designed as spherical bearings. Advantageously, the first actuator can be installed quickly and easily via a joint pivot connection. Further, spherical plain joint pivot connections are robust and reliable.

Preferably, the second control arm of the first knee lever of the first joint arrangement has a first joint pivot. Advantageously, the first connection element of the first actuator can be connected to the first knee lever via the first joint pivot. Further, a set-up force for the vehicle flap is advantageously introduced directly into the second control arm of the first knee lever to ensure defined adjustment kinematics of the first joint arrangement.

Preferably, the first control arm of the second knee lever of the first joint arrangement has a second joint pivot. Advantageously, the second connection element of the first actuator can be connected to the second knee lever via the second joint pivot. Further, an opening force for the vehicle flap is advantageously introduced directly into the second control arm of the first knee lever, in that the first control arm of the second knee lever forms an abutment in combination with the first end stop and the first counter stop in order to ensure a defined adjustment kinematics of the first joint arrangement.

More expediently, the first actuator is designed as a pyrotechnic actuator. Advantageously, a particularly fast setup movement of the vehicle flap is made possible, so that the vehicle flap is immediately and abruptly transferred to the pedestrian protection position in the event of a collision. The pyrotechnic actuator is further advantageously virtually free of internal inertia and internal friction, so that in the event of a collision the vehicle flap always reliably reaches the pedestrian protection position before a person strikes the vehicle flap.

Preferably, when the vehicle flap is moved to the pedestrian protection position, a movement of the vehicle flap occurs in a horizontal x-direction and in a vertical z-direction. Via the defined adjustment kinematics of the first joint arrangement of the drive device, it is advantageously possible to raise the vehicle flap in the z-direction upwards away from the vehicle body during the displacement into the pedestrian protection position and simultaneously to displace it in a direction towards a windshield to the rear in the x-direction. This advantageously allows the vehicle flap to assume a greater inclination in the pedestrian protection position, reducing the risk of injury to a pedestrian. In addition, it is advantageously possible to cover components arranged in an area of the windshield, particularly windshield wipers, by the vehicle flap displaced in the x-direction.

BRIEF SUMMARY OF THE DRAWINGS

The present disclosure is explained in more detail below with reference to the following drawings.

DETAILED DESCRIPTION

Figure 1:
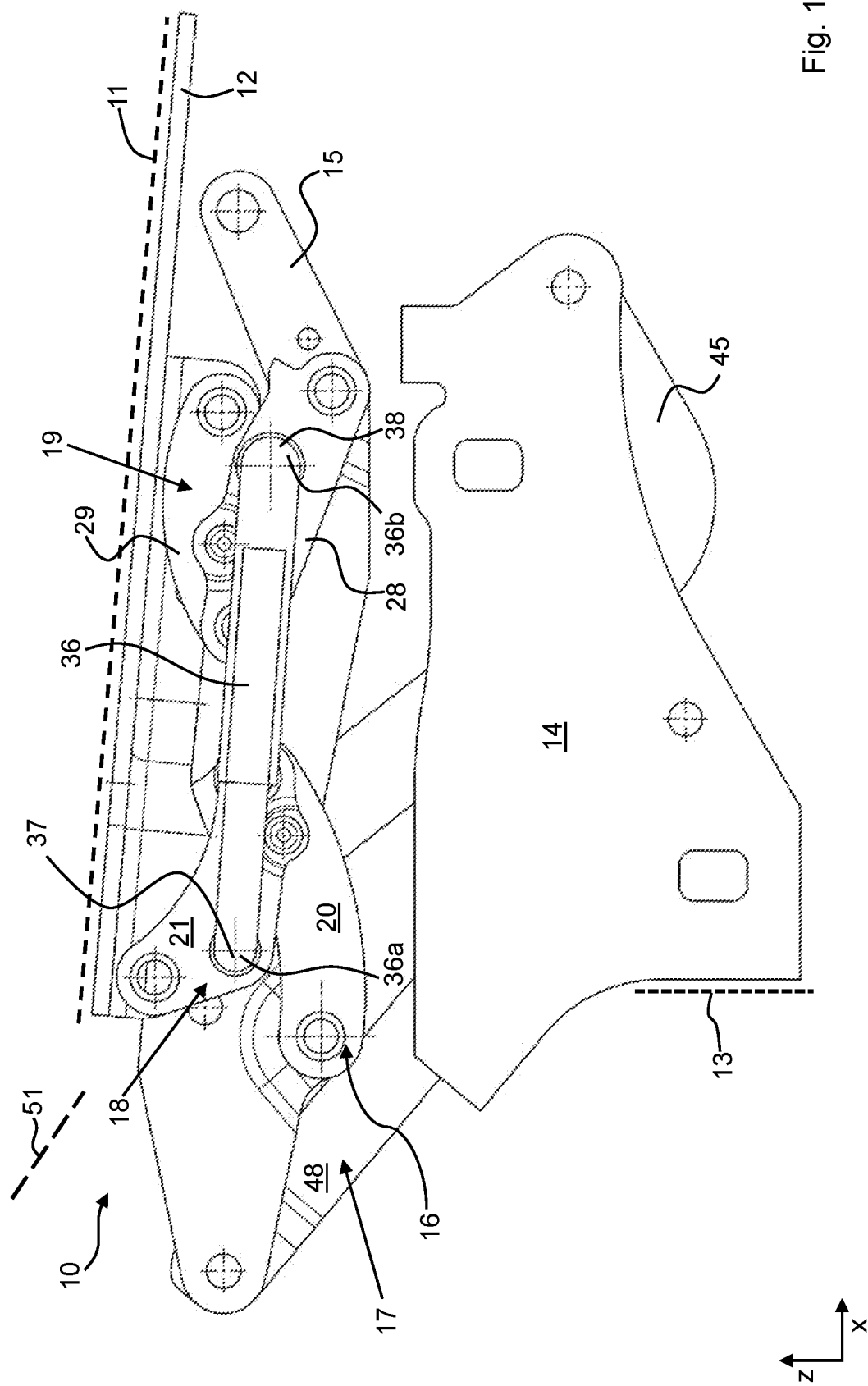
FIG. 1 shows a side view of an embodiment of a non-activated drive device in the normal mode.

FIG. 1 shows a preferred embodiment of a drive device 10 according to the present disclosure in a side view. The drive device 10 comprises a flap part 12 attachable to a vehicle flap 11 shown as a dashed line, and a body part 14 attachable to a vehicle body 13 shown as a dashed line. The flap part 12 can be set up relative to the body part 14 via a first joint arrangement 16, so that the vehicle flap 11 can be raised or displaced into a pedestrian protection position. In the non-activated state of the drive device 10 in normal operation shown here, the vehicle flap 11 is in the normally closed, non-raised position.

In addition to the first joint arrangement 16, a second joint arrangement 17 is provided, which is used for normal opening and closing of the vehicle flap 11. In this case, the second joint arrangement 17 comprises an intermediate lever 15, which is coupled in an articulated manner to the body part 14 via a first control control arm 45 and a second control control arm 48. In the embodiment example shown here, the second joint arrangement 17 is advantageously designed as a four-bar control armage. Alternatively, however, the second joint arrangement can be designed as a single joint. In this case, the intermediate lever 15 is connected to the flap part 12 via the first joint arrangement 16, wherein during a normal opening movement the intermediate lever 15 is pivoted together with the first joint arrangement 16 and the flap part 12. Advantageously, a first adjustment kinematics provided by the first joint arrangement 16 for raising the vehicle flap into the pedestrian protection position and a second adjustment kinematics provided by the second joint arrangement 17 for opening and closing the vehicle flap in normal operation are designed independently of each other. In particular, the intermediate lever 15 does not move when the first joint arrangement 16 is actuated to raise the vehicle flap 11, but rather serves as a stationary base for the first joint arrangement 16.

The first joint arrangement 16 comprises a first knee lever 18 and a second knee lever 19, wherein the first knee lever 18 comprises a first control arm 20 and a second control arm 21 and the second knee lever 19 likewise comprises a first control arm 28 and a second control arm 29. In the embodiment shown here, the first hinge 20 of the first knee lever 18 and the first hinge 28 of the second knee lever 19 are hingedly coupled to the intermediate lever 15. The second hinge 21 of the first knee lever 18 and the second hinge 29 of the second knee lever 19 are each hingedly coupled to the flap part 12. Advantageously, the flap part 12 or the vehicle flap 11 coupled to the flap part 12 can be raised into the pedestrian protection position relative to the vehicle body 13 or the body part 14 via the first joint arrangement 16.

A first actuator 36, which is designed as a linear actuator, is arranged between the first knee lever 18 and the second knee lever 19 to drive the lifting movement into the pedestrian protection position. In the embodiment example shown here, the first actuator 36 is designed as a pyrotechnic actuator, as this can perform a particularly fast lifting movement.

The first actuator 36 has a first connection element 37 at a first end 36a and a second connection element 38 at a second end 36b of the first actuator 36. Here, the first connection element 37 and the second connection element 38 of the first actuator 36 are each designed as a hinged connection, after which the first actuator 36 is hingedly coupled to the first joint arrangement 16 via a hinged connection. Specifically, the first connection element 37 is hingedly coupled to the first knee lever 18 of the first joint arrangement 16, and the second connection element 38 of the first actuator 36 is hingedly coupled to the second knee lever 19 of the first joint arrangement 16.

In the event of a collision of the vehicle with a pedestrian, the drive device 10, in an area facing a windshield 51 of the vehicle indicated as a dashed line, abruptly and immediately displaces the vehicle flap 11 upwardly in a z-direction away from the vehicle body 13 of the vehicle so that a deformation space is provided to reduce a risk of injury to the pedestrian.

Figure 2:
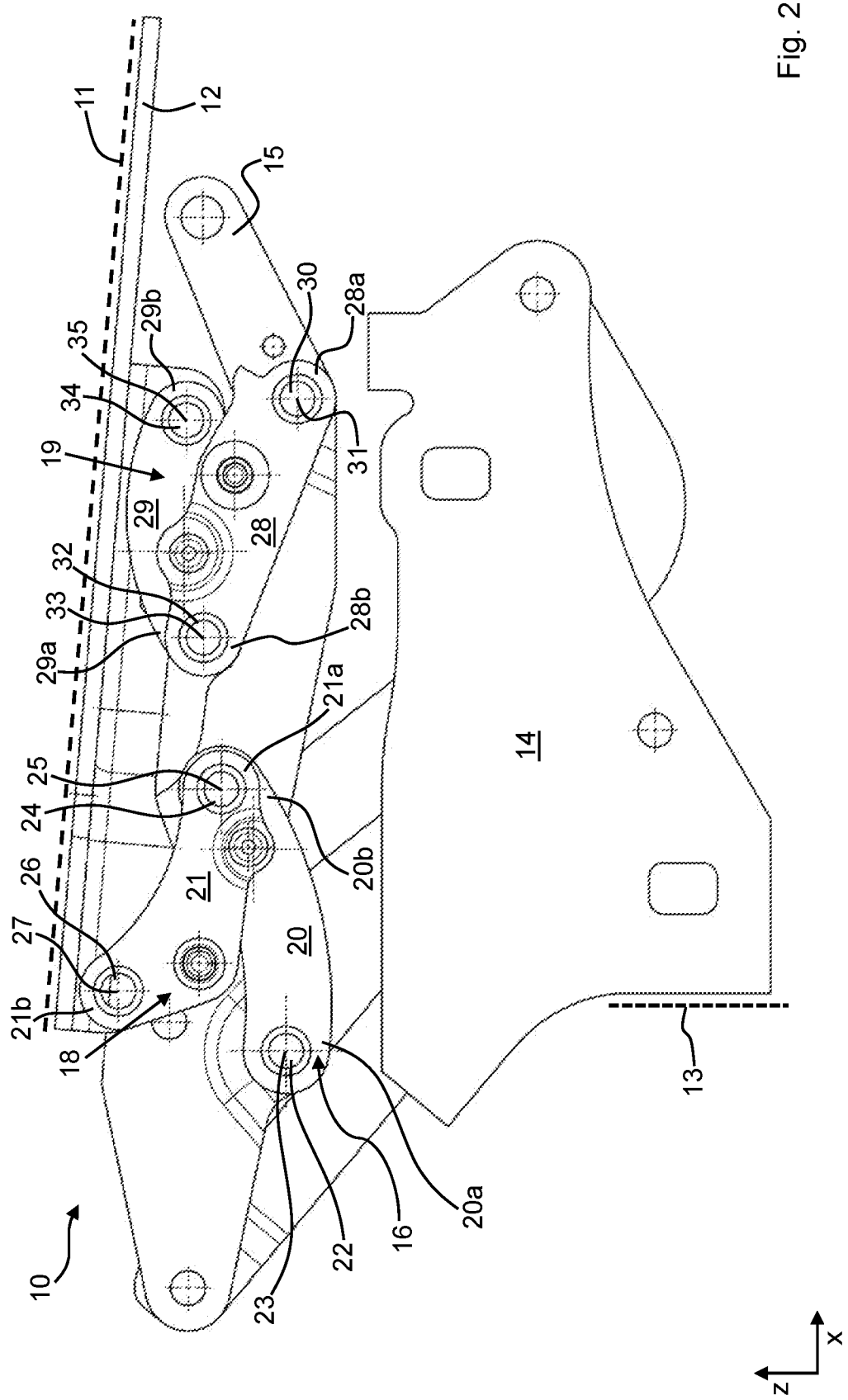
FIG. 2 shows a side view of the drive device of FIG. 1 without a first actuator.

Referring to FIG. 1, FIG. 2 shows a side view of the non-activated drive device 10, wherein, however, the first actuator 36 is not shown for clarity. The first control arm 20 of the first knee lever 18 has a first flat curved body with a first end 20a and with a second end 20b. The second control arm 21 has a second flat body with a first end 21a and with a second end 21b.

The first end 20a of the first control arm 20 is rotatably coupled to the intermediate lever 15 about a first axis of rotation 23 of the first intermediate lever control arm 22 via a first intermediate lever joint 22 that vertically extends through the first flat body of the first control arm 20.

The second end 20b of the first control arm 20 is hingedly coupled to the first end 21a of the second control arm 21 via a first knee joint 24. Here, the first knee joint 24 passes through the first flat body of the first control arm 20 and the second flat body of the second control arm 21 of the first knee lever 18 so that the second end 20b of the first control arm 20 and the first end 21a of the second control arm 21 are rotatable relative to each other about a first knee joint rotation axis 25. The second end 21b of the second control arm 21 of the first knee lever 18 is rotatably coupled to the flap part 12 about a second axis of rotation 27 via a first flap part hinge 26 that perpendicularly extends through the second flat body of the second control arm 21.

In the non-activated state of the drive device 10 shown herein, the first control arm 20 and the second control arm 21 of the first knee lever 18 of the first joint arrangement 16 enclose a first acute angle such that the first joint arrangement 16 is compactly collapsed below the vehicle flap 11, wherein the first control arm 20 and the second control arm 21 of the first knee lever 18 overlap in a scissor-like manner.

The second knee lever 19 of the first joint arrangement 16 has a first control arm 28 and a second control arm 29, wherein the first control arm 28 has a first flat body with a first end 28a and with a second end 28b. The second control arm 29 has a second flat curved body with a first end 29a and with a second end 29b.

Here, the first end 28a of the first control arm 28 is rotatably coupled to the intermediate lever 15 about a first axis of rotation 31 via a second intermediate lever hinge 30 that vertically extends through the first flat body of the first control arm 28.

The second end 28b of the first control arm 28 is rotatably coupled to the first end 29a of the second control arm 29 via a second knee joint 32 about a second knee joint rotation axis 33. Here, the second knee joint 32 perpendicularly intersects the first flat body of the first control arm 28 and the second flat body of the second control arm 29 of the second knee lever 19 so that the second end 28b of the first control arm 28 and the first end 29a of the second control arm 29 of the second knee lever 19 are rotatable about the second knee joint rotation axis 33 of the second knee joint 32.

The second end 29b of the second control arm 29 of the second toggle 19 is rotatably coupled to the flap part 12 about a second axis of rotation 35 via a second flap part hinge 34 which perpendicularly passes through the second flat body of the second control arm 29.

In the non-activated state of the drive device 10, the first control arm 28 and the second control arm 29 of the second knee lever 19 of the first joint arrangement 16 enclose a second acute angle such that the first joint arrangement 16 is compactly collapsed below the vehicle flap 11, wherein the first control arm 28 and the second control arm 29 of the second knee lever 19 overlap in a scissor-like manner.

Figure 3:
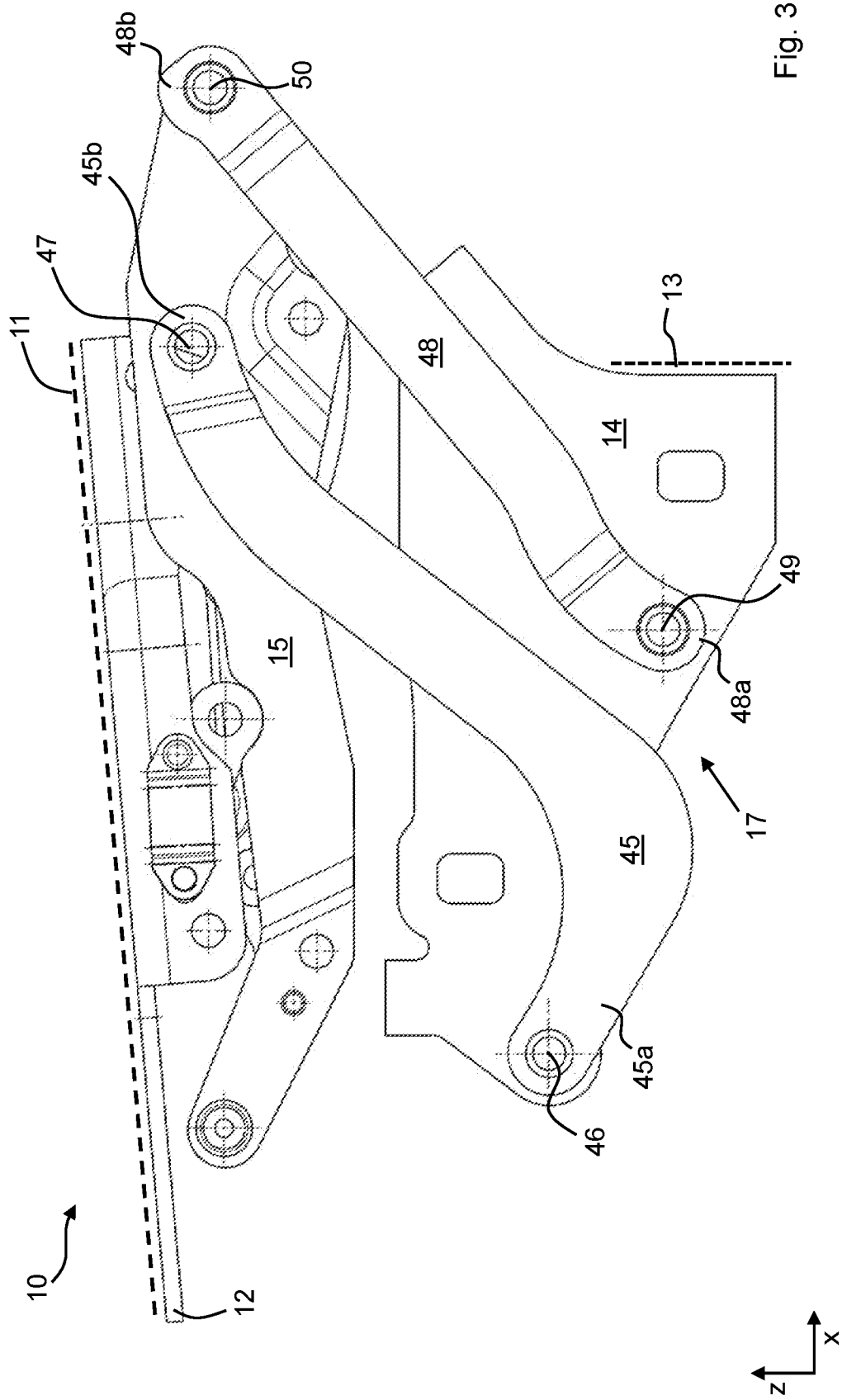
FIG. 3 shows a rear view of the non-activated drive device in the normal mode shown in FIG. 2.

FIG. 3 shows a rear view of the drive device 10 of FIG. 2, in which the second joint arrangement 17, designed as a four-bar control armage, is more clearly visible. The first control arm 45 of the second joint arrangement 17 has a first end 45a and a second end 45b. The first end 45a of the first control arm 45 is hingedly coupled to the body member 14 via a first control arm hinge 46, and the second end 45b of the first control arm 45 is hingedly coupled to the intermediate lever 15 via a second control arm hinge 47.

The second control arm 48 of the second joint arrangement 17 has a first end 48a and a second end 48b. The first end 48a of the second control arm 48 is hingedly coupled to the body member 14 via a first control arm hinge 49, and the second end 48b of the second control arm 48 is hingedly coupled to the intermediate lever 15 via a second control arm hinge 50.

Figure 4:
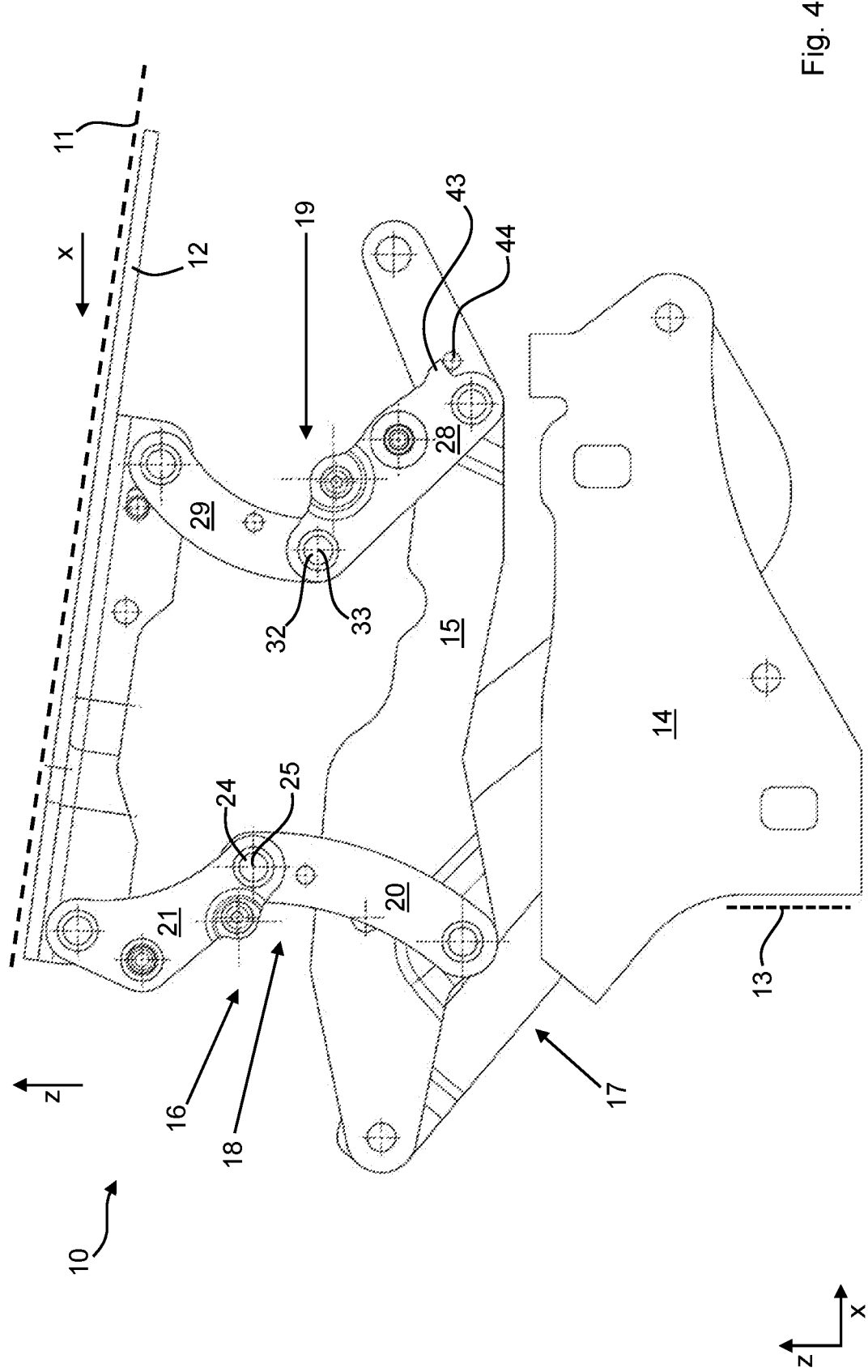
FIG. 4 shows a side view of the activated drive device in a pedestrian protection position.

FIG. 4 shows a side view of the drive device 10 in an erected pedestrian protection position, in which the vehicle flap 11 is held in an elevated erected position via the first joint arrangement 16 so that a deformation space is formed below the vehicle flap 11. In the raised activated pedestrian protection position, the intermediate lever 15 as well as the second joint arrangement 17 remain unmoved in their original position as in normal vehicle operation. For clarity, the first actuator 36, which drives the setup movement, is not shown in FIG. 4.

When the vehicle flap 11 is moved to the pedestrian protection position, the first knee joint 24 of the first knee lever 18 and the second knee joint 32 of the second knee lever 19 move away from each other due to the force caused by the first actuator 36, so that the first control arm 20 and the second control arm 21 of the first knee lever 18 now enclose a first obtuse angle. Similarly, the first control arm 28 and the second control arm 29 of the second knee lever 19 now include a second obtuse angle. Further, in the pedestrian protection position, a first end stop 43 of the first control arm 28 of the second knee lever 19 strikes a first counter stop 44 to prevent further displacement of the first control arm 28 of the second knee lever 19 so that the first knee lever 18 and the second knee lever 19 have a defined displacement kinematics and a defined end position.

A displacement kinematics of the vehicle flap 11 during a displacement into the pedestrian protection position provides that via the first joint arrangement 16 the vehicle flap 11 is displaceable both in a z-direction upwards and in an x-direction— namely in a direction towards the windshield 51. In this respect, arrows are shown in the x-direction and in the z-direction, schematically indicating the directions of a setup movement of the vehicle flap 11.

Figure 5:
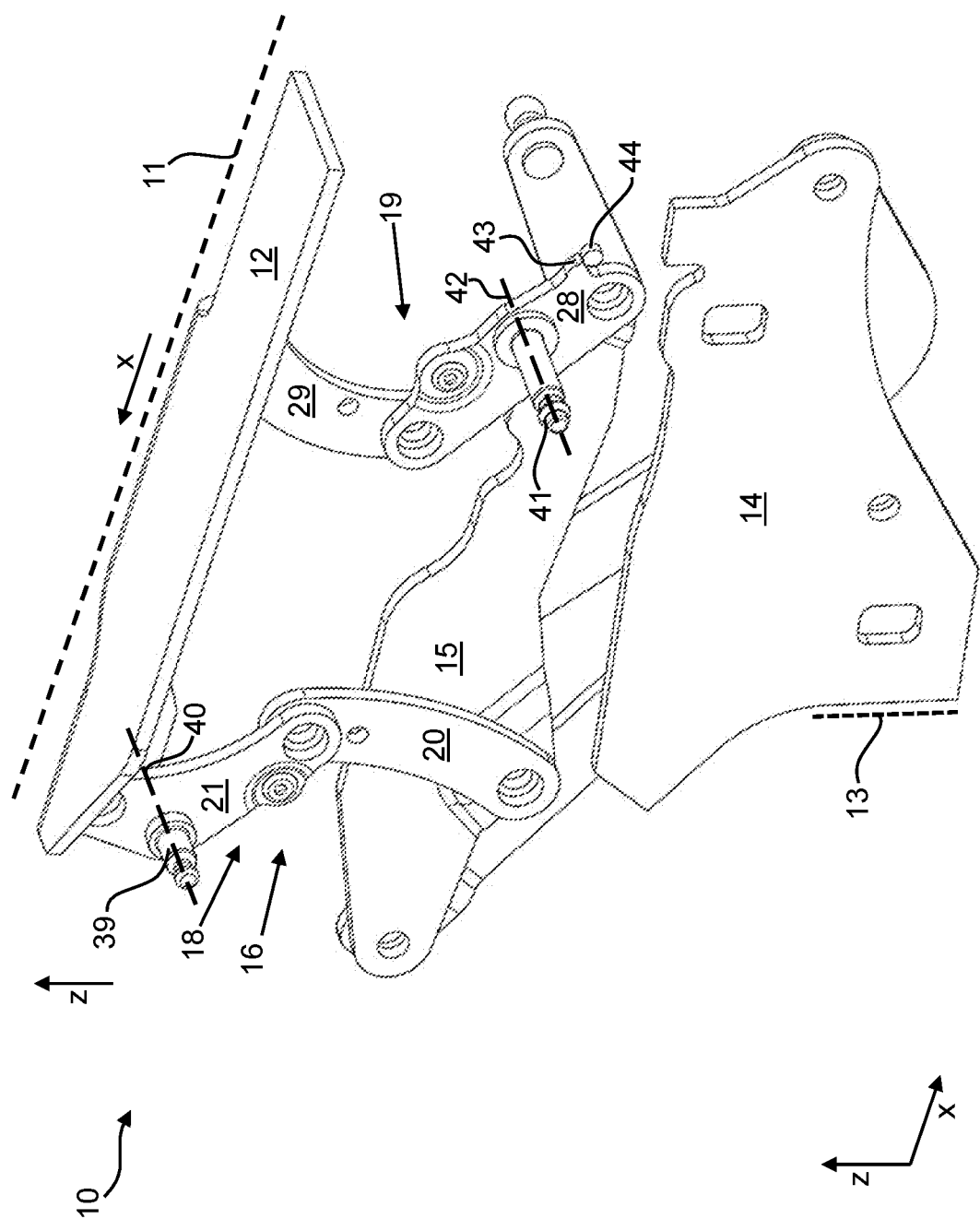
FIG. 5 shows a perspective view of the drive device from FIG. 4 in the pedestrian protection position.

FIG. 5 shows a perspective view of the activated drive device 10 corresponding to FIG. 4 with an erected vehicle flap 11, which is in a pedestrian protection position. In particular, a first joint pivot 39 as well as a first joint pivot rotation axis 40 and a second joint pivot 41 defining a second joint pivot rotation axis 42 are identifiable, wherein the joint pivots 39; 41 serve to connect the first actuator 36 to the first joint arrangement 16.

For clarity, the first actuator 36 is not shown in FIG. 5. The first connection element 37 of the first actuator 36 is rotatably couplable to the second control arm 21 of the first knee lever 18 via the first joint pivot 39 about a first joint pivot axis of rotation 40. The second connection element 38 of the first actuator 36, which is opposite the first connection element 37 of the first actuator 36, can be coupled to the first control arm 28 of the second knee lever 19 via a second joint pivot 41 so as to be rotatable about a second joint pivot axis 42.

The first joint pivot rotation axis 40 and the second joint pivot rotation axis 42 are arranged orthogonally with respect to a longitudinal axis of the first actuator 36. Thus, the first end 36a of the first actuator 36 is arranged to rotate about the first joint pivot axis 40, and the second end 36b of the first actuator 36 is arranged to rotate about the second joint pivot axis 42.

Further, the first counter stop 44 is identifiable as a pivot projecting from the intermediate lever 15. To define a setup movement of the first joint arrangement 16, the first control arm 28 of the second knee lever 19 has a first end stop 43 that abuts a first counter stop 44 arranged on the intermediate lever 15. The first end stop 43 is designed as a protruding nose and the first counter stop 44 is designed as a pivot projecting from the intermediate lever 15.

Figure 6:
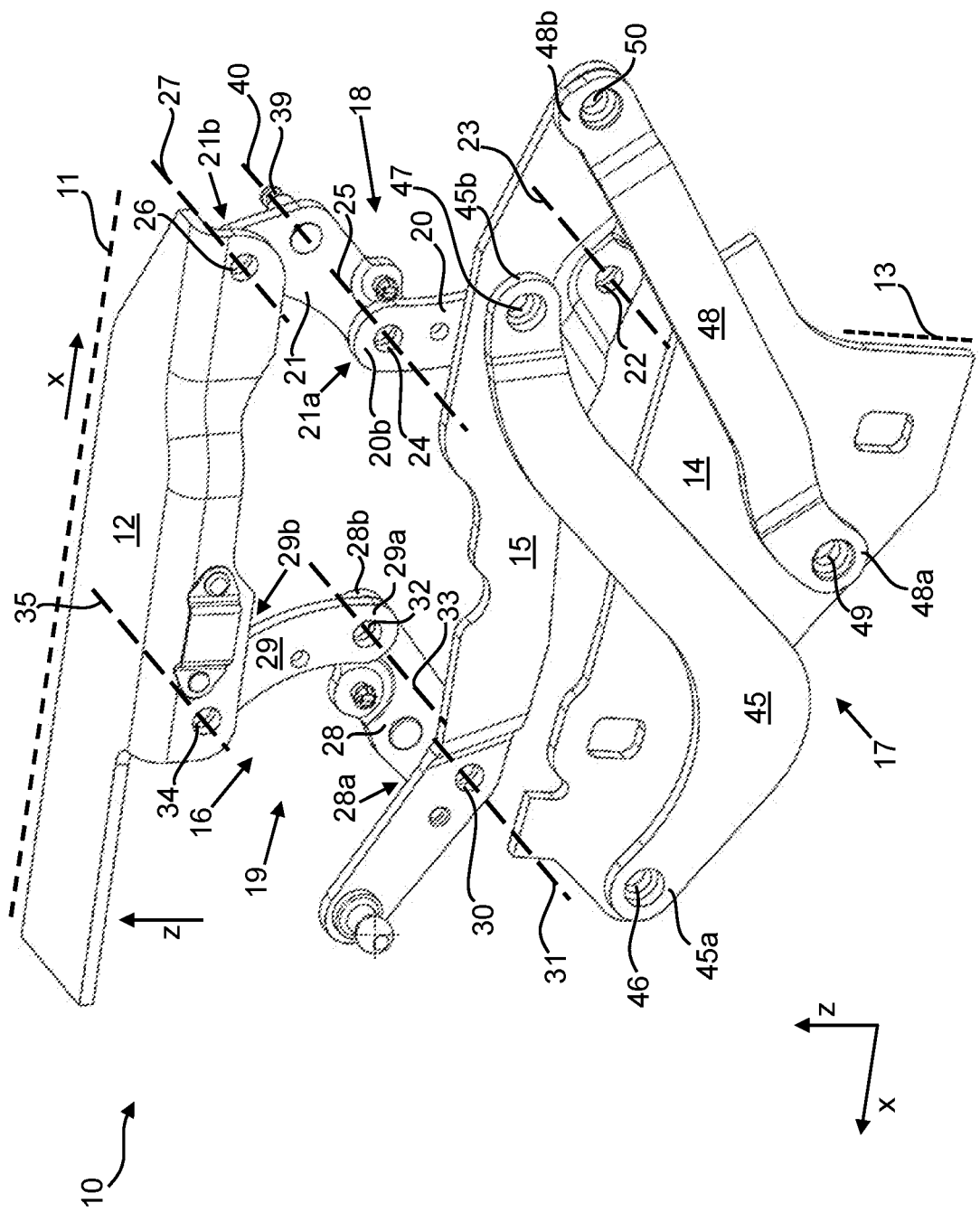
FIG. 6 shows a perspective view of the activated drive device in the pedestrian protection position from the rear.

FIG. 6 shows a perspective view of the activated drive device 10 corresponding to FIG. 4 and FIG. 5 from the rear. Here, it can be seen that the intermediate lever 15 as well as the second joint arrangement 17 remain unmoved in the original position with respect to normal operation of the vehicle when the vehicle flap 11 is moved to the pedestrian protection position as well as within the pedestrian protection position.

The drive device 10 functions as follows:

The vehicle has a normal mode in which the vehicle flap 11 can be opened and closed either manually or automatically by means of, for example, a spindle drive. The opening and closing of the vehicle flap 11 is substantially for the care and maintenance of an engine of the vehicle or for loading and unloading luggage to provide access to an engine compartment or trunk.

In the normal operation of the vehicle, the first joint arrangement 16 of the drive device 10 according to FIG. 1 is arranged in a non-activated, folded as well as compact state between the flap part 12 and the body part 14. When the vehicle flap 11 is opened and/or closed, the first joint arrangement 16 is completely co-located in the collapsed state with the vehicle flap 11 as one structural unit so that the drive device 10 always remains in a non-activated collapsed state throughout normal operation.

The vehicle has sensors that detect a collision or an imminent collision with a pedestrian or with a bicyclist, so that in the event of a collision or an imminent collision, these sensors send a signal to the first actuator 36 of the drive device 10 so that the first actuator 36 immediately and abruptly transfers the drive device 10 from normal operation to the pedestrian protection position via an actuator that can be driven by means of an ignited explosive charge.

In this case, an explosive charge located in the pyrotechnic first actuator 36 is ignited, causing the first control arm 28 of the second knee lever 19 to pivot clockwise about the first axis of rotation 31 of the second intermediate lever joint 30 via the second connection element 38 of the first actuator 36 until the first end stop 43 of the first control arm 28 of the second knee lever 19 abuts against the first counter stop 44.

As a result, the second end 36*b* of the first actuator 36 now has an end stop, preventing further displacement of the second knee lever 19. Accordingly, for the most part, a positioning force of the now-activated first actuator 36 is transmitted to the second control arm 21 of the first knee lever 18, causing the first knee lever 18 and the second knee lever 19 to be simultaneously displaced from a collapsed position each having an acute angle to a raised, deployed position each having an obtuse angle.

By means of the first knee lever 18 and the second knee lever 19, the vehicle flap 11 is abruptly and directly displaced in a direction away from the vehicle body 13. In particular, the vehicle flap 11 is first displaced upward in a z-direction and subsequently displaced in an x-direction, namely toward the windshield 51 of the vehicle, so that the vehicle flap 11 is in the desired pedestrian protection position.

In addition, in order for the vehicle flap 11 to remain in the desired pedestrian protection position in accordance with FIGS. 4 to 6, the first actuator 36 acts as a locking means, preventing the vehicle flap 11 from moving back in a z-direction downward toward the vehicle body 13.

The present disclosure has been explained above with reference to an embodiment in which the first connection element 37 is rotatably coupled to the second control arm 21 of the first knee lever 18, and the second connection element 38 is rotatably coupled to the first control arm 28 of the second knee lever 19. It is understood that the first actuator 36 may also be connected between the first knee lever 18 and the second knee lever 19 in other configurations. In either case, it is necessary for the first actuator 36 to be coupled to the first knee lever 18 and the second knee lever 19, respectively, in order to be able to apply a force to set up the first joint arrangement 16.

The present disclosure has been explained above with reference to an embodiment in which the first actuator 36 also functions as a locking means. It is understood that a separate locking means may also be provided, which ensures that the first joint arrangement 16 remains in the erected pedestrian protection position long enough or also ensures that the first joint arrangement 16 does not move even in the normal operation.

What is claimed is:

1. A drive device for a deployable vehicle flap, comprising:
    a flap part associated with the vehicle flap,
    a body part associated with a vehicle body,
    a first joint arrangement being arranged between the flap part and the body part, comprising a first knee lever and a second knee lever, wherein the first knee lever and the second knee lever each comprise a first control arm and a second control arm, wherein the first control arm of the first knee lever and the second control arm of the first knee lever are hingedly coupled to one another and are rotatable relative to each other about a first knee joint rotation axis, wherein the first control arm of the second knee lever and the second control arm of the second knee lever are hingedly coupled to one another and are rotatable relative to each other about a second knee joint rotation axis,
    a second joint arrangement for opening and closing the vehicle flap in a normal operation,
    at least a first actuator for raising the vehicle flap to a pedestrian protection position,
    wherein the first actuator has a first connection element and a second connection element,
    wherein the first connection element of the first actuator is hingedly coupled to the first knee lever of the first joint arrangement,
    wherein the second connection element of the first actuator is hingedly coupled to the second knee lever of the first joint arrangement,
    wherein the first connection element of the first actuator is hingedly coupled to the second control arm of the first knee lever at a distance from the first knee joint rotation axis, and
    wherein the second connection element of the first actuator is hingedly coupled to the first control arm of the second knee lever at a distance from the second knee joint rotation axis.

2. The drive device according to claim 1, wherein the first joint arrangement and the second joint arrangement are coupled to one another via an intermediate lever.

3. The drive device according to claim 2, wherein the first control arm of the first knee lever and the first control arm of the second knee lever are hingedly coupled to the intermediate lever.

4. The drive device according to claim 1, wherein the second control arm of the first knee lever and the second control arm of the second knee lever are hingedly coupled to the flap part.

5. The drive device according to claim 4, wherein the second control arm of the first knee lever of the first joint arrangement has a first joint pivot.

6. The drive device according claim 1, wherein the first control arm of the second knee lever of the first joint arrangement has a second joint pivot.

7. The drive device according to claim 1, wherein in the normal operation of the vehicle flap the first control arm and the second control arm of the first knee lever enclose a first acute angle.

8. The drive device according to claim 7, wherein in the normal operation of the vehicle flap, the first control arm and the second control arm of the second knee lever include a second acute angle.

9. The drive device according to claim 1, wherein the first control arm of the second knee lever has a first end stop, and in that a first counter stop is associated with the first end stop.

10. The drive device according to claim 9, wherein the first counter stop is designed as a protruding pivot, and the first end stop is designed as a nose protruding from the first control arm of the second knee lever.

11. The drive device according to claim 1, wherein the first connection element and the second connection element of the first actuator are designed as spherical bearings.

12. The drive device according to claim 1, wherein the first actuator is designed as a pyrotechnic actuator.

13. A drive device for a deployable vehicle flap, comprising:
    a flap part associated with the vehicle flap,
    a body part associated with a vehicle body,
    a first joint arrangement being arranged between the flap part and the body part, comprising a first knee lever and a second knee lever, wherein the first knee lever and the second knee lever each comprise a first control arm and a second control arm,
    a second joint arrangement for opening and closing the vehicle flap in a normal operation, at least a first actuator for raising the vehicle flap to a pedestrian protection position, wherein the first actuator has a first connection element and a second connection element, wherein the first connection element of the first actuator is hingedly coupled to the first knee lever of the first joint arrangement, wherein the second connection element of the first actuator is hingedly coupled to the second knee lever of the first joint arrangement, wherein the first connection element of the first actuator is hingedly coupled to the second control arm of the first knee lever, wherein the second connection element of the first actuator is hingedly coupled to the first control arm of the second knee lever, and wherein the first joint arrangement and the second joint arrangement are coupled to one another via an intermediate lever.

14. The drive device according to claim 13, wherein the first control arm of the first knee lever and the first control arm of the second knee lever are hingedly coupled to the intermediate lever.

15. A drive device for a deployable vehicle flap, comprising:

a flap part associated with the vehicle flap, a body part associated with a vehicle body, a first joint arrangement being arranged between the flap part and the body part, comprising a first knee lever and a second knee lever, wherein the first knee lever and the second knee lever each comprise a first control arm and a second control arm, a second joint arrangement for opening and closing the vehicle flap in a normal operation, at least a first actuator for raising the vehicle flap to a pedestrian protection position, wherein the first actuator has a first connection element and a second connection element, wherein the first connection element of the first actuator is hingedly coupled to the first knee lever of the first joint arrangement, wherein the second connection element of the first actuator is hingedly coupled to the second knee lever of the first joint arrangement, wherein the first connection element of the first actuator is hingedly coupled to the second control arm of the first knee lever, wherein the second connection element of the first actuator is hingedly coupled to the first control arm of the second knee lever, wherein the first control arm of the second knee lever has a first end stop, and in that a first counter stop is associated with the first end stop, and wherein the first counter stop is designed as a protruding pivot, and the first end stop is designed as a nose protruding from the first control arm of the second knee lever.

* * * * *